(12) United States Patent
Styles et al.

(10) Patent No.: US 8,064,057 B2
(45) Date of Patent: Nov. 22, 2011

(54) COLOUR ASSESSMENT APPARATUS AND METHOD

(75) Inventors: Ian Styles, Thurlaston (GB); Michael Butterworth, Hinckley (GB); John Dakin, Rothley (GB)

(73) Assignee: Verivide Ltd, Enderby (GB)

( * ) Notice: Subject to any disclaimer, the term of this patent is extended or adjusted under 35 U.S.C. 154(b) by 0 days.

(21) Appl. No.: 12/677,484

(22) PCT Filed: Sep. 11, 2008

(86) PCT No.: PCT/GB2008/003081
§ 371 (c)(1),
(2), (4) Date: Mar. 10, 2010

(87) PCT Pub. No.: WO2009/034327
PCT Pub. Date: Mar. 19, 2009

(65) Prior Publication Data
US 2010/0195103 A1     Aug. 5, 2010

(30) Foreign Application Priority Data

Sep. 11, 2007   (GB) .................................... 0717676.1

(51) Int. Cl.
*G01J 3/46*       (2006.01)
(52) U.S. Cl. ..................................................... 356/402
(58) Field of Classification Search ........... 356/402–425
See application file for complete search history.

(56) References Cited

U.S. PATENT DOCUMENTS

| 5,633,722 | A | 5/1997 | Wasinger et al. |
| 2005/0040774 | A1 | 2/2005 | Mueller |
| 2006/0023447 | A1 | 2/2006 | Justel et al. |
| 2006/0152172 | A9 * | 7/2006 | Mueller et al. ................. 315/291 |

FOREIGN PATENT DOCUMENTS

| JP | 1309460 A | 12/1989 |
| JP | 10275600 A | 10/1998 |
| WO | 2007/083250 A1 | 7/2007 |

OTHER PUBLICATIONS

Varelas, Dimitrios, International search report for PCT/GB2008/003031, Jan. 12, 2009.
Dr. Paul Baxter, United Kingdom Search report for GB0717676.1, Nov. 30, 2007.

\* cited by examiner

*Primary Examiner* — Tarifur Chowdhury
*Assistant Examiner* — Abdullahi Nur
(74) *Attorney, Agent, or Firm* — Chernoff, Vilhauer, McClung & Stenzel

(57) ABSTRACT

A method of color assessment of a sample (10) with respect to a reference illuminant, includes illuminating the sample (10) with a light source (12) that comprises a fluorescent lamp (18) and a plurality of light-emitting diodes (24). The spectrum of the LEDs (24) supplements the spectrum of the fluorescent lamp (18) to reduce deviations between the combined spectrum of the light source (12) and a target spectrum. The target spectrum may be that of the reference illuminant or it may be adjusted to make allowance for known properties of a color assessment cabinet (2) or an observing instrument (16). The LEDs (24) may be arranged so that their light passes through the bulb of the fluorescent lamp (18), which thereby acts as a diffuser. Alternatively, the LEDs (24) and the fluorescent lamp (18) may be located in a housing (31) from which their light can only reach the sample (10) after being mixed by reflection from multiple facets (34).

17 Claims, 5 Drawing Sheets

COLOUR ASSESSMENT APPARATUS AND METHOD

This is a national stage application filed under 35 USC 371 based on International Application No. PCT/GB2008/003081, filed Sep. 11, 2008, and claims priority under 35 USC 119 of United Kingdom Patent Application No. 0717676.1, filed Sep. 11, 2007.

FIELD OF THE INVENTION

The invention relates to the field of colour assessment of samples with respect to reference illuminants.

Colour assessment is important for determining the appearance of samples under known lighting conditions in a diverse range of industries such as textiles, printed media and paints. The assessment may be to check the quality of a single sample under prescribed lighting conditions, for example a photograph in a magazine, or may be to compare different samples, for example to ensure that two samples of dyed fabric that are to be used in a garment match one another reliably in different lighting conditions. It is essential that the conditions under which the samples are assessed should be standardized, for example so that a supplier and a purchaser can compare sample products consistently using their respective apparatus.

The reference illuminants may represent natural daylight, typical store lighting or other light sources, as defined by an international body such as the Commission Internationale de l'Eclairage (CIE) or specified by a commercial or industrial body. An illuminant is defined by its spectral power distribution, i.e. the intensity of the light at each wavelength over a specified range. For example, the CIE has defined a particular spectral power distribution D65, which is described as "average north sky daylight" and is shown in FIG. 1. The range of wavelengths will include visible light (about 380 to 760 nm) but for some applications may also include wavelengths in the ultra-violet or infra-red because light in those regions can generate a visible response in certain dyes. In this patent specification and its claims, "spectrum" is used as an abbreviation of "spectral power distribution".

The human eye detects colour using three types of receptor, identified as red, green and blue but each having its own spectral response over a range of wavelengths. Because the whole spectrum of visible light is measured in the eye using only three channels, light having different spectral power distributions may trigger the same pattern of responses in the three receptors and therefore be perceived as the same overall colour. This is known as metamerism. The spectrum received by the eye when viewing a sample is a combination of the inherent colour of the sample (i.e. the proportion of incident light that it reflects at each wavelength) and the spectrum of light that is used to illuminate the sample. Because of metamerism, two samples that are inherently of different colours may appear the same colour when viewed under one illuminant but they are likely to appear different colours under other illuminants. To avoid such divergent results, it is important that the illumination in colour assessment apparatus should match as closely as possible the reference illuminant that is prescribed for the assessment in question.

As previously stated, an illuminant can only be fully defined by its spectral power distribution. However, the appearance of the illuminant to the human eye can be characterized in terms of the responses that it generates in each of the red, green and blue receptors. Those three values can be reduced further to two (essentially by normalizing the overall intensity of the light) to characterize the colour by its x,y co-ordinates in the plane of a chromaticity diagram. These co-ordinates are known as the "colour point" of the illuminant. In the standard CIE 1931 Chromaticity Diagram shown in FIG. 2, the horseshoe-shaped region represents the full gamut of colours visible to the normal human eye, with pure colours that correspond to a single wavelength lying on the curved perimeter. In that diagram, for example, the point (0.3, 0.6) represents a particular yellowish green; and the CIE D65 reference illuminant shown in FIG. 1 maps to a colour point in the white part of the chromaticity diagram given by co-ordinates (0.3127, 0.3291) and marked as D.

It should be remembered that an infinite number of different spectral power distributions will map to the same colour point. They will all be perceived as a similar colour by the eye when viewed directly but may give different responses when reflected from samples. Thus for colour assessment applications it is not sufficient simply to match the colour point of the reference illuminant but an attempt must be made to approximate its whole spectrum as closely as is practicable.

Black body radiation of any given temperature has a particular spectral power distribution, which can similarly be mapped to a colour point on the chromaticity diagram. The full range of possible temperatures forms a line on the diagram, as shown in FIG. 2. Spectra having colour points that fall close to the black body line can be characterized still more crudely by reference to a single corresponding temperature value. The black body line passes through the white part of the chromaticity diagram and colour temperature values are commonly used to quantify the extent to which a "white" light tends towards blue or yellow in colour. For example, the CIE D65 reference illuminant shown in FIG. 1 corresponds to a colour temperature of 6500K.

It should be remembered that a wide range of different spectra—which may not closely match a black body spectrum at all—will map to any given colour temperature. Thus for colour assessment applications it is not sufficient simply to match the colour temperature of the reference illuminant but an attempt must be made to approximate its whole spectrum as closely as is practicable.

BACKGROUND OF THE INVENTION

General purpose colour assessment is typically carried out in an illumination cabinet that includes a light source in its upper part. The sample may be placed on the floor of the cabinet, or a flat sample may be fixed to a planar or curved inclined surface for ease of viewing. The front of the cabinet may be open for viewing by eye or the cabinet may be closed with the sample being viewed via an instrument such as a digital camera in the interior. In more specialist applications, such as continuous production lines, different arrangements may be in place for colour assessment and most aspects of the present invention remain relevant to those as will be evident to the skilled reader.

In order to allow viewing of the sample under different lighting conditions, it is often possible to switch between multiple light sources, each designed to matched a different reference illuminant. To allow the effective visual comparison of a sample under different illuminants, the switching must be almost instantaneous. The size of the cabinet limits the number of light sources that can be accommodated and hence the number of reference illuminants that can be approximated.

The light sources for known colour assessment cabinets are typically either incandescent or fluorescent.

Incandescent sources use a high temperature filament that produces light having a continuous spectrum of the same general form as black body radiation, with most power at the red end of the spectrum. Natural daylight and the corresponding reference illuminants for daylight have most power in the green and blue parts of the spectrum, so the incandescent lamps have to be run at high power to provide sufficient green and blue light. In an essentially subtractive process, the majority of the red and orange light is then filtered out to match the desired reference illuminant, with the result that energy is wasted and the cabinet can become excessively hot.

Fluorescent sources use a voltage discharge to excite rarefied gas in a sealed tube. The inside of the tube is coated with phosphors that are thereby caused to fluoresce, each in a narrow band of wavelengths. In an essentially additive process, the outputs of the different phosphors combine to build up an appropriate distribution of power across the desired range of wavelengths. Fluorescent sources are energy efficient but their spectra tend to be rather discontinuous because of the narrow band emissions of the phosphors. For colour assessment applications, the number of phosphors is typically increased compared with fluorescent tubes for domestic or commercial use to mimic as closely as possible a reference illuminant. However, increasing the number of phosphors adds to the cost of the lamps. A further problem is that the phosphors decay unevenly with time, especially at blue wavelengths, so that the spectral power distribution of the light source changes and the lamp has to be discarded and replaced after a period much less than its normal life would be in less colour-sensitive applications. Moreover, ordinary start-up circuits for fluorescent bulbs cause a delay before the bulb illuminates therefore, to provide the instant switching between sources that is necessary for visual colour comparison of samples, specialist and expensive start-up circuits need to be provided.

The invention in its broadest aspect uses light-emitting diodes (LEDs) to compensate for deficiencies in a fluorescent light source during colour assessment. LEDs are reasonably energy efficient and are available in a wide variety of colours with both broad and narrow bands of wavelengths. They have the great advantage over additional phosphors in the fluorescent lamp that their intensity can be adjusted during use, including the choice to switch off certain of the LEDs entirely (i.e. zero intensity). Thus the LEDs may be used in the following ways:

To reduce the number of phosphors required in the fluorescent lamp, by filling gaps in the spectrum of the lamp.

To prolong the useful life of the lamp or improve the colour constancy of the light source over the lifetime of the lamp, by compensating for changes in the lamp's phosphors as they age.

To allow a light source to approximate multiple reference illuminants using a single, basic fluorescent lamp, by using the LEDs in different combinations to compensate for the differences between the basic lamp and each of the reference illuminants. This saves on space and cost and increases the flexibility of the cabinet, which can be "reprogrammed" for new light sources without requiring new hardware. The intensity of the LEDs can be changed instantly while the basic fluorescent lamp remains on continuously, therefore it is possible to switch instantly between different illuminants without providing a specialist start-up circuit for the lamp.

The spectrum of light that falls on the sample is determined not only by the spectrum that the light source emits but also by changes in the spectrum when the light from the source is reflected from the cabinet walls. If two cabinets have differently coloured walls, LEDs in their respective light sources can further be used to compensate for that difference and allow the cabinets to be used for consistent colour assessment, for example by two parties at different locations.

If the sample is not to be viewed directly but through an instrument such as a digital camera, that instrument will have its own spectral response, i.e. the way its sensitivity to light varies with wavelength. The past approach has been to illuminate the sample using light that approximates a reference illuminant, to image the sample using the camera, and then to use image processing software to compensate for the difference between the spectral responses of the camera and the human eye. The invention provides an alternative approach, which is to change the illumination of the sample so that the way the camera images the sample under the changed illumination approximates the way the human eye perceives the sample under the reference illuminant. For example, if the camera is less sensitive to blue light, then the relative intensity of blue LEDs in the light source may be increased compared with the reference spectrum.

The control of intensity of the LEDs may be achieved by varying the applied current or voltage to change the intensity of light continuously emitted from them; or it may preferably be achieved by pulse width modulation of the current through the LEDs to change the average intensity of the emitted light, the pulses being at sufficiently high frequency that they are not noticeable to the observer or observing instrument.

Although the present invention is described with reference to light-emitting diodes, it is clear that it would be equally applicable to other light-emitting semiconductor devices. If the wavelength of such devices were tunable, that would provide a further way of controlling the spectral power distribution of the light source.

Although the invention is described with reference to a linear fluorescent tube, it would work equally well with other, less common shapes.

DRAWINGS

DESCRIPTION OF A PREFERRED EMBODIMENT

Figure 1:
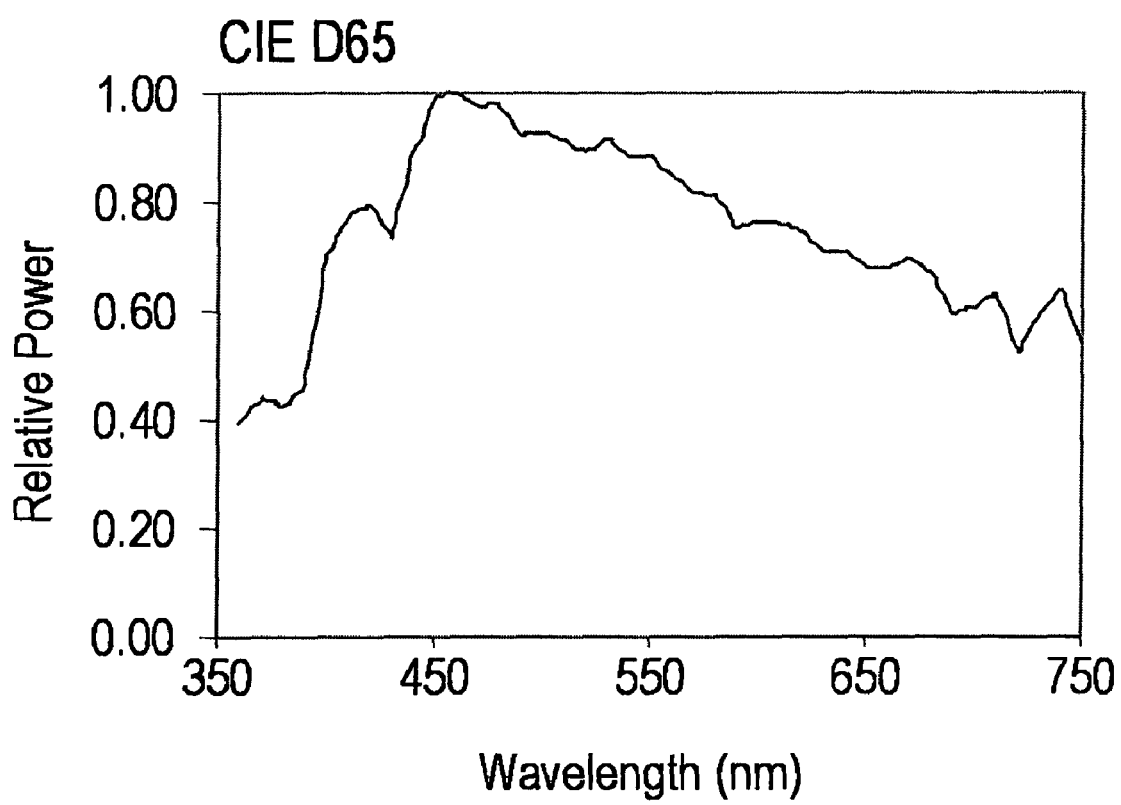
FIG. 1 shows the spectral power distribution of the reference illuminant CIE D65.
Figure 2:
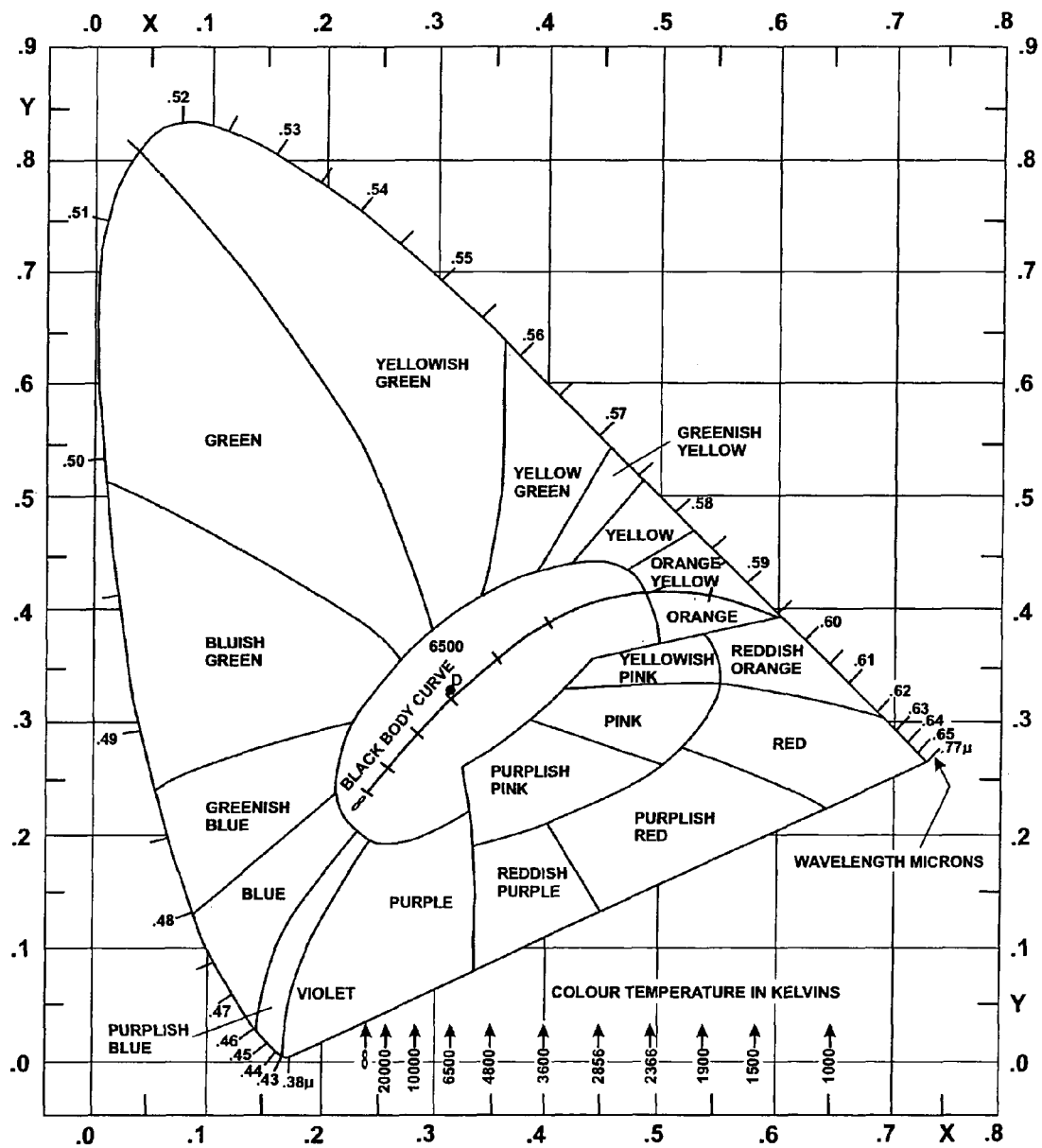
FIG. 2 shows the CIE 1931 Chromaticity Diagram.
Figure 3:
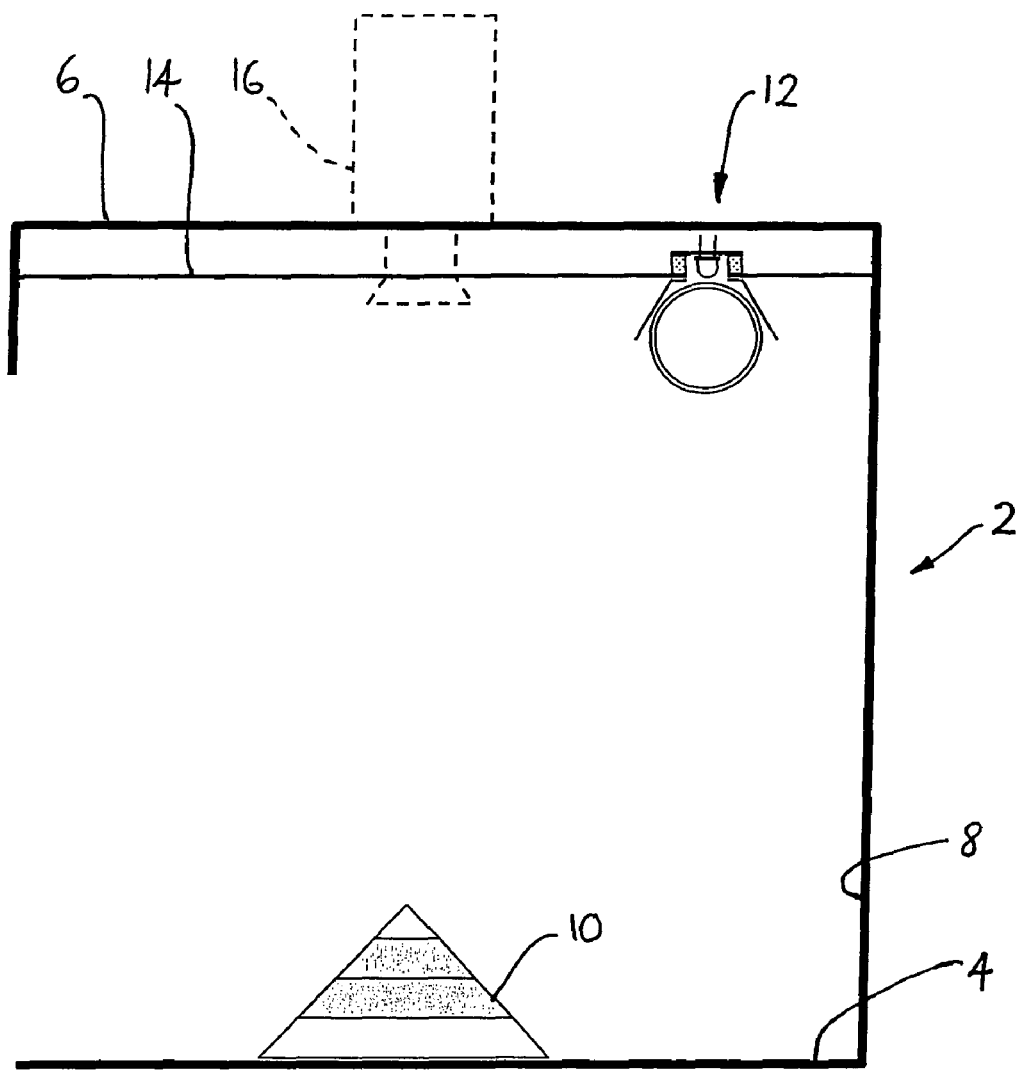
FIG. 3 is a schematic cross section through a colour assessment cabinet embodying the invention.

FIG. 3 shows a colour assessment cabinet 2, comprising a floor 4, roof 6, back wall 8 and side walls (which are parallel to the plane of the figure and not shown) configured to form an open-fronted box. One or more samples 10 may be placed on the floor 4 of the cabinet 2, illuminated under carefully controlled conditions by a light source 12 and viewed through the open front of the box for assessment of their colour. If the sample 10 is a flat sheet such as a photograph or print, it may be mounted against the back wall 8 or against an inclined or curved surface (not shown) provided in the angle between the back wall 8 and the floor 4.

The interior surfaces of the cabinet 2 have a colour and a texture suitable for scattering light from the light source 12 around the interior of the cabinet, so as to light the sample 10 uniformly and provide a neutral background against which to view it. Although only a single light source 12 is illustrated, in an off-centre position on the roof 6 of the cabinet 2, more than one light source 12 may be provided, either of the same kind to provide more even illumination, or of different kinds to allow switching between them to vary the lighting conditions in the cabinet 2. The light sources may in various positions on the roof 6 or on the back wall 8 or side walls of the cabinet 2. As shown, a false ceiling 14 is provided to conceal electrical connections to the light source 12.

Instead of viewing the sample 10 by eye, it may be viewed and/or recorded via an observing instrument such as a digital camera 16, optionally set into the roof 6 or a wall of the cabinet 2. In that case, the front of the cabinet 2 will generally be closed by a door (not shown) to exclude ambient light and enable the lighting conditions to be fully controlled.

Figure 4:
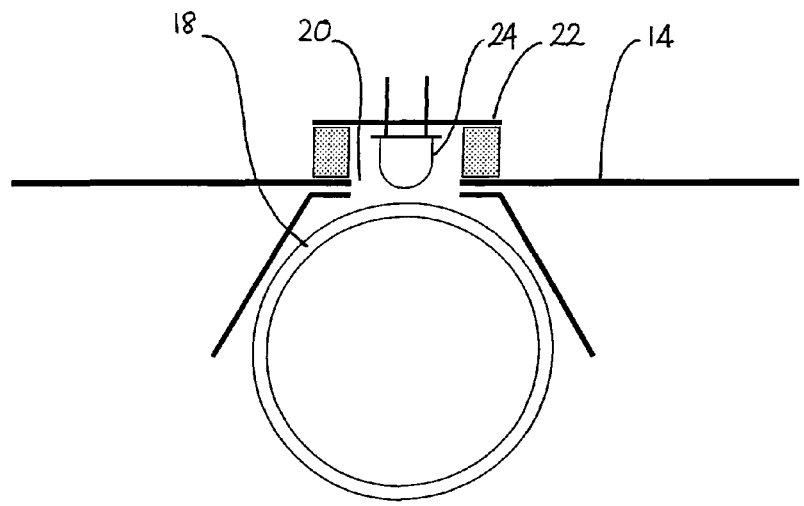
FIG. 4 is an enlargement of the light source of FIG. 3 viewed in cross section.
Figure 5:
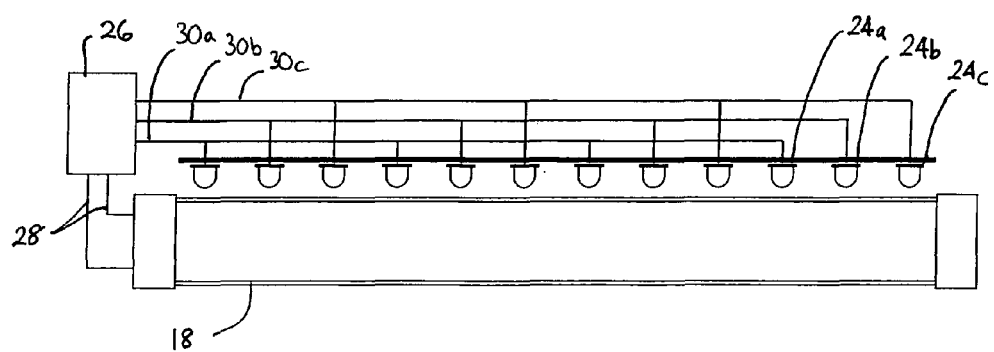
FIG. 5 is a schematic side view of the light source of FIG. 3.

The light source is shown in greater detail—though still schematically—in FIGS. 4 and 5. A fluorescent tube 18 is mounted parallel to the roof 6 of the cabinet 2. Parallel and adjacent to the tube 18 is a slot 20 in the ceiling 14 of the cabinet 2. Behind the slot 20 there is mounted, on a board 22 or in any other convenient manner, a line of light emitting diodes (LEDs) 24. The LEDs 24 are arranged such that light emitted from them can only enter the cabinet 2 by passing through the slot 20 and the bulb 18 of the fluorescent lamp. The bulb 18 thus acts as a diffuser to spread the light from the LEDs 24 through the cabinet 2 and, if the LEDs 24 are of different colours as discussed below, to mix their colours so that a uniform light reaches the sample 10.

In the Figures, a single row of LEDs 24 is shown but multiple rows would be possible to increase the number or the mixing of the LEDs. Further reflecting means (not shown) may be provided to direct the light from the LEDs through the slot 20 and the bulb 18 of the fluorescent lamp. Further diffusing means (not shown) may be provided to scatter the light from the LEDs in addition to or instead of the bulb 18.

The LEDs 24 may be of multiple colours (including white). The LEDs 24 are chosen to emit wavelengths that complement those emitted by the phosphors of the fluorescent lamp 18. Typically, the peak wavelength of an LED 24 will fall between the "spikes" in the spectrum of the lamp 18. However, the wavelengths emitted by certain LEDs may overlap those already present in the spectrum of the fluorescent lamp 18, for example to change the balance of colours in the spectrum or to compensate for the weakening output from certain phosphors as the lamp 18 ages. When multiple colours of LED 24 are used, they should generally be distributed along the row rather than grouped together, in order to promote mixing of the light from different LEDs.

FIG. 5 also schematically shows a control circuit 26, which is connected to a power supply (not shown). The control circuit 26 switches on or off power to the fluorescent bulb 18 via lines 28 and controls power to the LEDs 24 via lines 30. Alternatively, the control of the fluorescent bulb 18 may be handled by an independent circuit. For simplicity, FIG. 5 shows a single wire leading from control circuit 26 to each LED 24 but naturally a complete electrical circuit will be required in practice. The LEDs 24 may be controlled in independent sets, which will typically be sets of a single colour. The figure shows three sets, namely LEDs 24a controlled on line 30a, LEDs 24b controlled on line 30b, and LEDs 24c controlled on line 30c.

The control circuit 26 not only switches on or off the respective sets of LEDs 24a,b,c but can independently control the intensity of each set. That is preferably achieved by using a pulse width modulation technique to alter the average intensity of the emitted light. By switching between different patterns of intensity of the respective LEDs of different colours, a single light source 12 can be made to approximate diverse reference illuminants by using the fluorescent tube 18 to supply a common background illumination and the LEDs to supply additional intensity in parts of the spectrum where it is required for a given reference illuminant.

The control circuit 26 may also control the relative intensities of LEDs 24 of different colours to compensate for ageing of the fluorescent lamp 18. Most simply, the circuit 26 measures the age of the lamp, either in terms of absolute time or in terms of the amount of time the lamp has actually been in use, and adjusts the relative intensities of the LEDs according to a predetermined formula that predicts the deterioration of each type of phosphor with time. Alternatively, the circuit 26 may respond to a feature of the lamp 18 that changes with age, such as its light output or its electrical characteristics.

The target spectrum that is approximated by combining the outputs of the fluorescent tube 18 and the LEDs 24 may not be the spectrum of the reference illuminant itself, but may be adjusted to take account of the viewing conditions in the cabinet 2. For example, the interior surfaces 4, 6, 8 of the cabinet will scatter the light from the light source before it reaches the sample 10 and may change its spectrum. If the properties of the cabinet 2 are known, then the target spectrum of the light source 12 may be altered to allow for these changes, whereby the light reaching the sample 10 may be a better match to the reference illuminant than the light leaving the light source 12. This may allow two different cabinets to give more consistent results. Alternatively, or additionally, if the sample 10 is to be viewed through an observing instrument such as a camera 16, the target spectrum may be adjusted to make allowance for the spectral response of the instrument.

Figure 6:
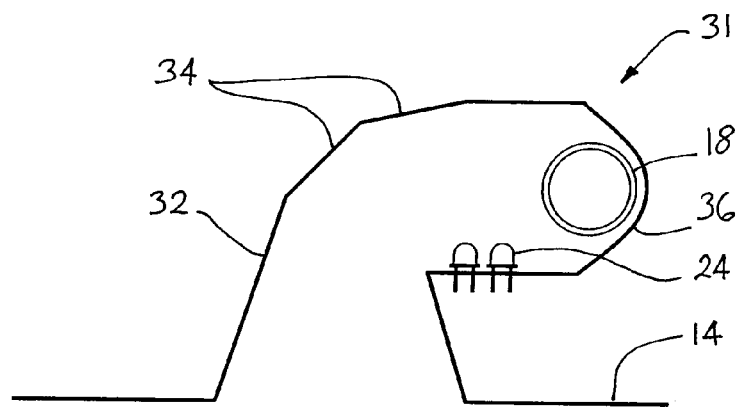
FIG. 6 is a cross section of an alternative to the light source of FIGS. 4 and 5.

FIG. 6 shows an alternative arrangement of the lamp 18 and LEDs 24 to that shown in FIGS. 4 and 5. A lamp housing 31 comprises a funnel-shaped opening 32 set into the ceiling 14 of the cabinet 2. The housing includes a corner, whereby the lamp 18 and one or more rows of LEDs 24 can be mounted in positions from which they cannot shine directly through the funnel 32 into the cabinet 2. Light from the lamp 18 and from the LEDs is reflected through the funnel 32 by facets 34 in an upper part of the lamp housing 31, and the light is thereby mixed together before entering the chamber 2. The facets are shown merely schematically in FIG. 6 and in a practical apparatus their number and configuration may be different. A reflector 36 may be provided behind the lamp 18 to direct its light towards the facets 34.

If multiple light sources are provided, each may have its own lamp housing 31 or multiple lamps 18 may be arranged in a single housing 31, possibly sharing a single set of LEDs 24.

The invention claimed is:

1. A method of color assessment of a sample with respect to a reference illuminant, comprising:
   illuminating the sample with a light source that approximates a target spectrum; and
   observing the illuminated sample to assess its color;
   wherein the light source comprises a fluorescent lamp and a plurality of light-emitting diodes;
   wherein the spectrum of the light-emitting diodes supplements the spectrum of the fluorescent lamp to reduce deviations between the combined spectrum of the light source and the target spectrum; and
   wherein the target spectrum differs from the spectrum of the reference illuminant.

2. A method according to claim 1, further comprising locating the sample in a viewing cabinet that has internal walls, wherein the target spectrum of the light source differs from the spectrum of the reference illuminant to compensate for changes in the spectrum of light from the light source as it reflects from the walls of the cabinet onto the sample.

3. A method according to claim 1, wherein the step of observing the sample is carried out using an observing instrument that has a spectral response, and wherein the target spectrum of the light source differs from the spectrum of the reference illuminant to compensate for the spectral response of the instrument.

4. A method according to claim 3, wherein the observing instrument is a camera.

5. A method according to claim 1, wherein the light-emitting diodes include diodes of different colors, the method further comprising changing the relative intensities of the diodes of different colors to correspond to different target spectra.

6. A method according to claim 5, further comprising controlling the intensities of the light-emitting diodes to compensate for changes in the spectrum of the fluorescent lamp as it ages.

7. A method according to claim 1, wherein the fluorescent lamp comprises a bulb, which is disposed so that the light from the light-emitting diodes diffuses through the bulb of the fluorescent lamp before reaching the sample.

8. Color assessment apparatus comprising:
a viewing cabinet containing a viewing field;
a light source for illuminating the viewing field; and
switching means for selecting a reference illuminant with respect to which the color of a sample placed in the viewing field is to be assessed;
wherein the light source comprises a fluorescent lamp and a plurality of light-emitting diodes,
wherein the light source approximates a target spectrum,
wherein the spectrum of the light-emitting diodes supplements the spectrum of the fluorescent lamp to reduce deviations between the spectrum of the light source and the target spectrum; and
wherein the target spectrum differs from the spectrum of the reference illuminant.

9. Color assessment apparatus according to claim 8, wherein the light-emitting diodes include diodes of different colors, and further comprising means for controlling the relative intensities of the diodes of different colors.

10. Color assessment apparatus according to claim 8, wherein the fluorescent lamp comprises a bulb, the bulb being arranged between the light-emitting diodes and the viewing field to act as a diffuser for light from the diodes.

11. Color assessment apparatus according to claim 10, wherein the bulb is a straight tube and the light-emitting diodes are arranged in a linear array adjacent to the tube.

12. Color assessment apparatus according to claim 8, wherein the fluorescent lamp and the light-emitting diodes are located such that they cannot shine directly onto the viewing field.

13. Color assessment apparatus according to claim 12, wherein the fluorescent lamp and the light-emitting diodes are located in a lamp housing that is recessed into a ceiling of the cabinet.

14. Color assessment apparatus according to claim 13, further comprising a plurality of facets positioned to reflect light from the lamp housing towards the viewing field.

15. Color assessment apparatus according to claim 8, wherein the viewing cabinet comprises internal walls and wherein the target spectrum differs from the spectrum of the reference illuminant to compensate for changes in the spectrum of light from the light source as it reflects from the walls towards the viewing field.

16. Color assessment apparatus according to claim 8, further comprising an instrument for observing the viewing field, the instrument having a spectral response, wherein the target spectrum differs from the spectrum of the reference illuminant to compensate for the spectral response of the instrument.

17. Color assessment apparatus according to claim 16, wherein the observing instrument is a camera.

* * * * *